United States Patent
Lotenberg

(10) Patent No.: US 8,156,429 B2
(45) Date of Patent: Apr. 10, 2012

(54) METHOD AND SYSTEM FOR ACCELERATING DOWNLOADING OF WEB PAGES

(75) Inventor: Ran Lotenberg, Ra'anana (IL)

(73) Assignee: Flash Networks. Ltd, Herzliya (IL)

( * ) Notice: Subject to any disclaimer, the term of this patent is extended or adjusted under 35 U.S.C. 154(b) by 1147 days.

(21) Appl. No.: 11/576,820

(22) PCT Filed: Oct. 17, 2005

(86) PCT No.: PCT/IL2005/001099
§ 371 (c)(1),
(2), (4) Date: Apr. 6, 2007

(87) PCT Pub. No.: WO2006/043274
PCT Pub. Date: Apr. 27, 2006

(65) Prior Publication Data
US 2008/0072136 A1    Mar. 20, 2008

Related U.S. Application Data

(60) Provisional application No. 60/621,524, filed on Oct. 22, 2004.

(51) Int. Cl.
*G06F 17/30* (2006.01)
(52) U.S. Cl. ...................................................... 715/255
(58) Field of Classification Search .................... 715/255
See application file for complete search history.

(56) References Cited

U.S. PATENT DOCUMENTS

| | | | |
|---|---|---|---|
| 6,108,676 A * | 8/2000 | Nakatsuyama | 715/210 |
| 6,163,779 A | 12/2000 | Mantha et al. | |
| 6,192,382 B1 | 2/2001 | Lafer et al. | |
| 6,249,844 B1 | 6/2001 | Schloss et al. | |
| 6,356,931 B2 | 3/2002 | Ismael et al. | |
| 6,493,717 B1 | 12/2002 | Junkin | |
| 6,585,777 B1 | 7/2003 | Ramaley et al. | |
| 6,589,291 B1 | 7/2003 | Boag et al. | |
| 6,704,024 B2 | 3/2004 | Robotham et al. | |
| 2001/0044809 A1 * | 11/2001 | Parasnis et al. | 707/513 |
| 2003/0051055 A1 | 3/2003 | Parrella, Sr. et al. | |
| 2003/0145017 A1 * | 7/2003 | Patton et al. | 707/104.1 |
| 2005/0204276 A1 * | 9/2005 | Hosea et al. | 715/501.1 |

* cited by examiner

*Primary Examiner* — Laurie Ries
*Assistant Examiner* — Tionna Smith
(74) *Attorney, Agent, or Firm* — Smith Risley Tempel Santos LLC; Gregory Scott Smith

(57) ABSTRACT

Web content based on markup language technology is delivered to a client device running a browser or similar application through a markup language file manipulator. Files requested by a client device are processed through the markup language file manipulator and the browser links embedded in the web content are traversed to fetch the objects associated with the browser links. The browser links are then replaced by the actual objects in the markup language file. The modified markup language file is then delivered to the client device and the client device is not required to further render the web content.

16 Claims, 5 Drawing Sheets

METHOD AND SYSTEM FOR ACCELERATING DOWNLOADING OF WEB PAGES

CROSS-REFERENCE TO RELATED APPLICATIONS

This application claims the benefit of, and is related to, U.S. Provisional Application for Patent filed on Oct. 22, 2004 and assigned Ser. No. 60/621,524 and having a title of METHOD AND SYSTEM FOR ACCELERATING DOWNLOADING OF WEB PAGES, the contents of which is incorporated herein by reference.

BACKGROUND OF THE INVENTION

The present invention relates to the field of data communication and, more particularly, to a system and method for accelerating data communication to improve the performance of browsing web pages.

The world is eagerly and enthusiastically embracing the Internet as the most popular medium for data communication between computers—even on a global basis. The Internet is a hierarchy of many computer networks, all of which are interconnected by various types of server computers. Some of the servers interconnected through the Internet include databases housing or storing a plurality of web pages. These web pages may be retrieved by users, also referred to as surfers, operating computers that are connected to the Internet and running browsers. Many current web pages are defined by markup languages (ML) files, including but not limited to, HTML, XML, WML, SGML, HDML etc. HTML is an acronym for Hyper Text Markup Language, XML is an acronym for Extensible Markup Language and WML is an acronym for Wireless Markup Language. SGML is an acronym for Standardized General Markup Language. HDML is an acronym for Handheld Device Markup Language. It should be noted that the terms "HTML", "XML", "HDML" and "WML" may be used interchangeably herein. Henceforth, the description of different embodiments of the present invention may use the term 'HTML' as a representative term for any of the various forms of markup languages unless specifically limited to a particular markup language.

A markup language file contains various commands, instructions, data and references that together, define the overall appearance of a web page once it is rendered using a browser or other similar application. Common HTML files may comprise information that is relevant to the web page, information such as but not limited to a style sheet, text, images, Java Scripts, links to a style sheet, links to Java Scripts, links to additional objects, links to other web pages, etc. A style sheet is a specification of a style that is used when presenting a document. The style specification includes information, such as the font and margins to be used, the formatting layout, and other types of information that indicate how the presented document should appear. Style sheets can be used for many types of document presentation, including printing the document, displaying it on a video display, processing the document by a speech synthesizer, etc. The style sheets may be encoded in a style sheet language including but not limited to Extensible Style sheet Language (XSL), Cascading Style Sheet Language (CSS), or Document Style Semantics and Specification Language (DSSSL).

In order to create a web page that can be easily updated or modified, common designers do not embed objects or segments of the web page into the web page. Instead, a designer will place links to the object in an HTML file. This technique is widely utilized, thus most HTML files only include basic text and links to style sheets, Java scripts, images, and other objects and not the style sheet or the object itself. Part of the links are used automatically by the browser during parsing the page, those links are referred as browser's links. For example, links to Java scripts, style sheets, and images can be browser's links. Other links are displayed to be selected by the surfer; those links are referred as surfer's links, for example, links to other web pages.

While surfing the World Wide Web (WWW) a surfer (client), utilizing a browser equipped computer, may send an HTTP (Hyper Text Transfer Protocol) request to a web server. In response, the web server may send an HTML file that defines the requested web page. In the disclosure of the different embodiments of the present invention the term computer represents any type of data communication device including, but not limited to, a laptop computer, a PDA, a cellular unit, a notebook computer, a personal computer, etc.

Upon receiving the HTML file, the browser begins parsing the HTML file. When a browser's link is found, the browser may stop or pause the parsing process, establish a new connection according to the browser's link, wait to get the object, parse the object and accordingly, may continue parsing the HTML file. In some cases, for example, when the browser's link defines a style sheet, then presenting of the text can be delayed until receiving the style sheet. Handling the browser's links during the rendering or presentment of the web page has an effect on the flow and timing of the presentment, increases the time to text (TTT) and affects the experience of the surfer.

Furthermore, fetching the objects by the browser increases the load on the Internet, and increases the time for downloading the page due to the overhead of setting new connections to the sites at which the objects are stored. By observing the operation of a browser during a surfing session, especially when the connection of the surfer's computer is done over an arrow bandwidth link such as a cellular link, illustrates that fetching the objects by the browser has a negative impact on the user's experience. Such object fetching can result in 10 to 40 percent increase in download time and causes the presentation of the page to be stammered.

Therefore there is a need in the art for a system and a method for embedding the objects that are associated with the browser's links into the HTML file at the server during downloading the markup language file. Such a system may reduce the number of links that a browser may need in order to fetch browser's links during parsing a web page. This technique reduces the download time of a web page, improves the time to text of the page and reduces the load over the net.

BRIEF SUMMARY OF THE DESCRIPTION

Different embodiments of the present invention resolve the above-described needs in the art by providing a system and a method that modifies markup language files before or during the transfer of the markup language file to a client that has requested the file. An embodiment of the present invention may operate to parse the HTML file, or any other relevant markup language file, before or during downloading the HTML file to the relevant client. An embodiment of the present invention may search for browser's links, including but not limited to links to style-sheets, java scripts, images, etc.

Upon, finding a browser's link, an exemplary embodiment of the present invention may operate to fetch the object, check the integrity of the object, and if the object is correct, the link to the object is removed and the fetched object is placed into the HTML file instead of the link. Then the modified HTML file is transferred to the client. The fetched object may be parsed, by an exemplary embodiment of the present invention, by looking for browser's links that may be embedded within the fetched object. The objects associated with the embedded browser's links may be fetched and placed into the HTML file instead of their links. An alternate embodiment of the present invention may recursively search into the fetched objects looking for additional browser's link. A configurable parameter may define the levels of recursion that will be traversed in such a search.

An exemplary embodiment of the present invention may be installed and operate within the web server. Other exemplary embodiments may be installed in a proxy server in a node along the connection between the client and the web server. Alternatively, exemplary embodiments of the present invention can be installed in the premises of an Internet service provider or in a communication service provider premises (such as cellular operator), etc.

Different embodiments of the present invention can be transparent to the client computer. Advantageously, the present invention has a positive effect on the user, in that it operates to accelerate the presentation the web page, reduces the TTT and the appearance of the page becomes fluent. Different embodiments of the present invention preserve the advantages that a markup language offers to a surfer. For example, the surfer is still able to cut and paste text elements and surfer's link are kept within the page, etc.

An exemplary embodiment of the present invention may handle one or more than one markup languages and one or more than one connections simultaneously.

Embodiments of the present invention can operate to reduce the number of new connections that a browser at the client may open automatically when it parses a markup language file, such as but not limited to, an HTML file.

Other objects, features, and advantages of the present invention will become apparent upon reading the following detailed description of the embodiments with the accompanying drawings and appended claims.

DETAILED DESCRIPTION OF EXEMPLARY EMBODIMENTS

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
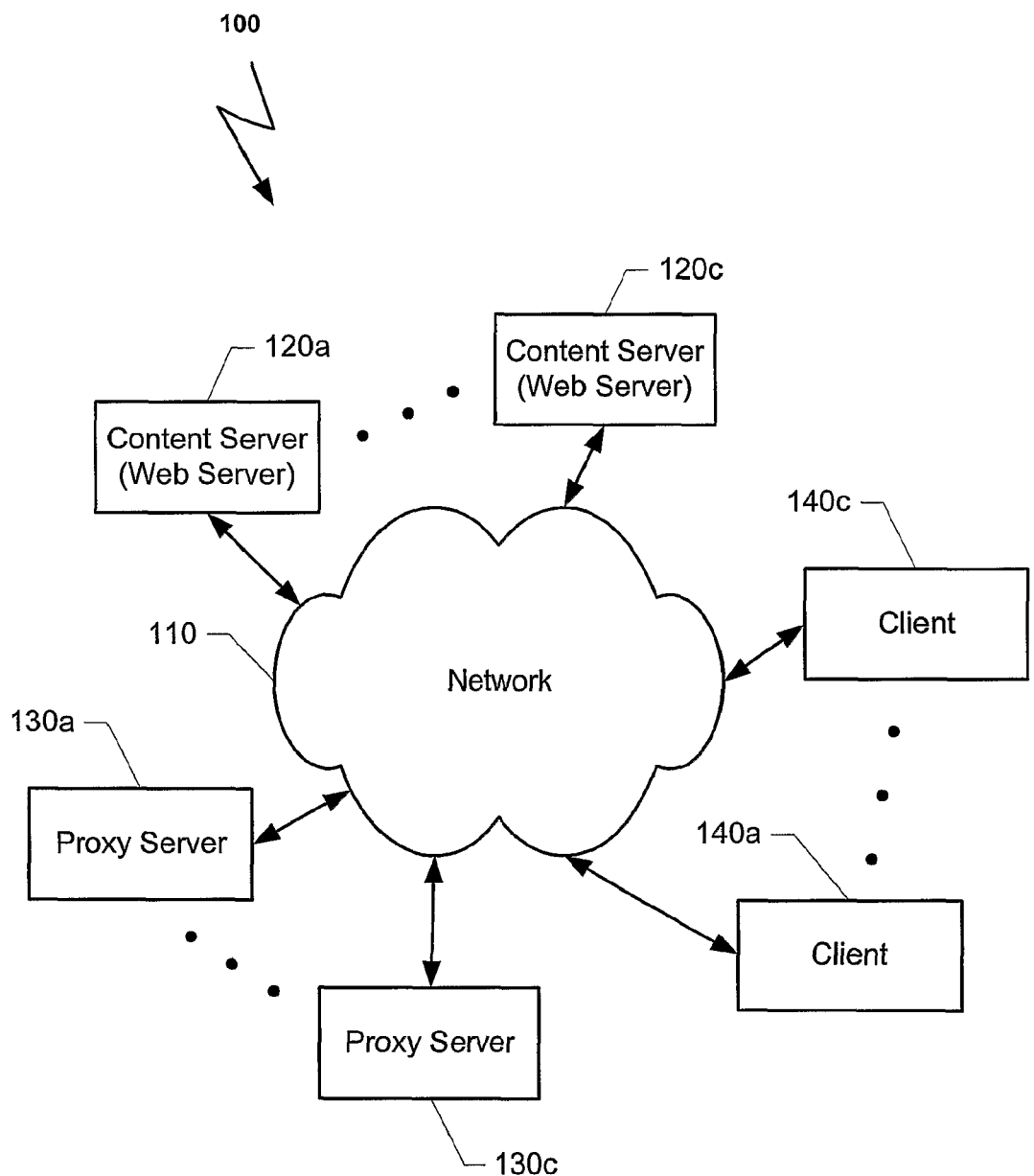
FIG. 1 illustrates a block diagram of an exemplary communication system that implements an exemplary embodiment of the present invention.

FIG. 1 illustrates a block diagram of an exemplary communication system that implements an exemplary embodiment of the present invention. The illustrated communication system 100 includes a network 110; a plurality of Content Servers (such as but not limited to web servers) 120$a$-$c$; a plurality of clients 140$a$-$c$; and a plurality of proxy servers 130$a$-$c$. It will be appreciated by those skilled in the art that depending upon its configuration and the needs, system 100 may comprise more than three of Content Servers 120$a$-$c$, clients 140$a$-$c$ and proxy servers 130$a$-$c$. However, for purposes of simplicity of understanding, three units of each are shown.

Network 110 is based on Internet Protocol (IP). It may represent one or more network segments, including but not limited to one or more Internet segments, one or more Intranets, etc. Network 110 may run over one or more type of physical network. It may run over a combination of PSTN, ISDN, Cellular, etc.

Network 110 may include intermediate nodes along the connection between a client and a web server. The intermediate node may include, but is not limited to, IP service provider servers, cellular service provider servers and other type of service provider equipment.

A plurality of clients 140$a$-$c$ may be connected over the network 110 to access proxy servers 130$a$-$c$ or web content servers 120$a$-$c$. Those skilled in the art will realize that a proxy server can be replaced by a hierarchy of proxy servers. A common client 140$a$-$c$ may run a browser software program in order to surf the network and to communicate with one or more content servers 120$a$-$c$ or one or more proxy servers 130$a$-$c$.

Figure 2:
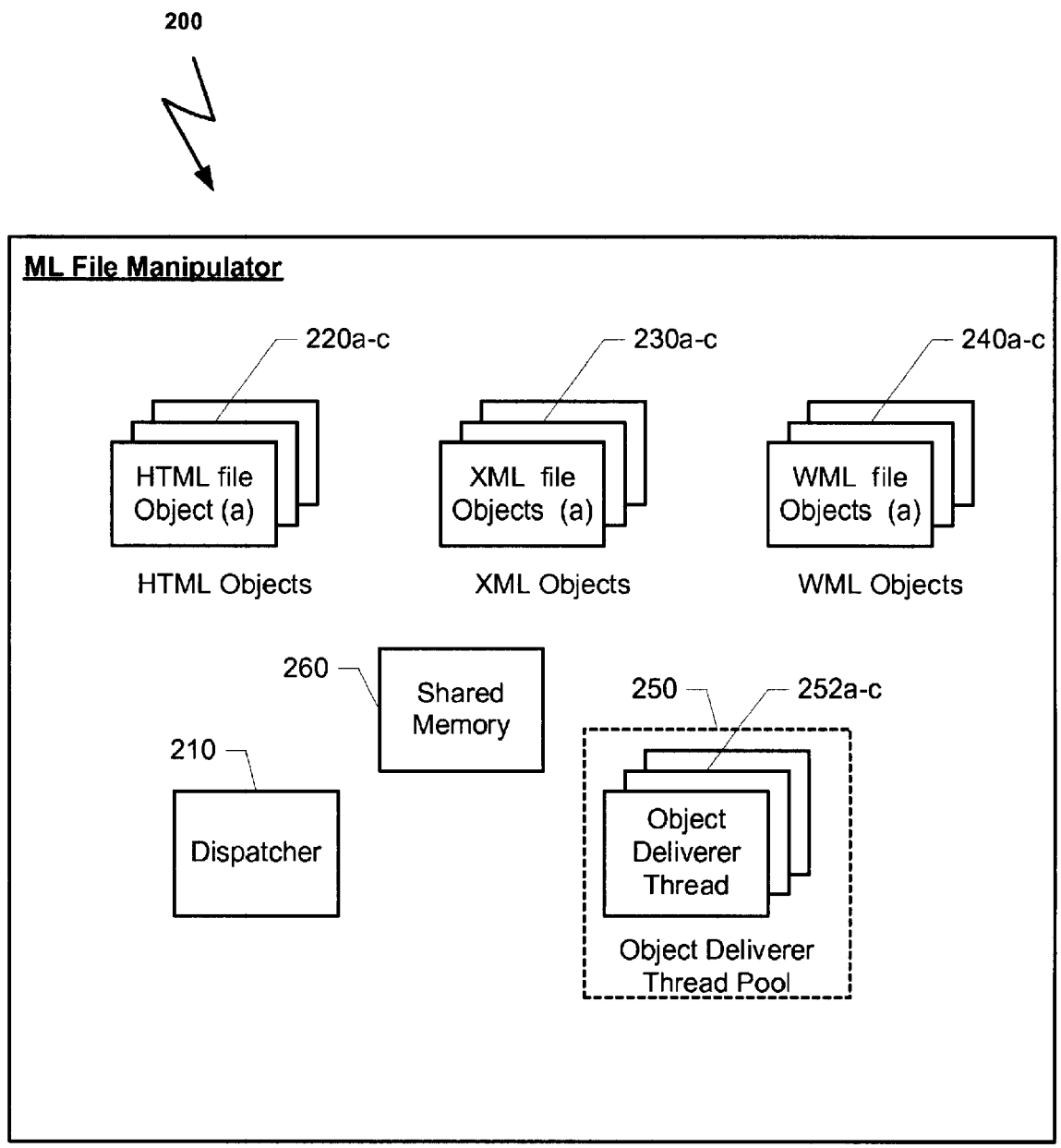
FIG. 2 illustrates a block diagram of relevant software modules of an exemplary embodiment of the present invention.

FIG. 2 illustrates a block diagram of relevant software modules of an exemplary embodiment of the present invention. The illustrated markup language file manipulator (MLFM) module 200, operating in accordance with an exemplary embodiment of the present invention, may be associated with one or more content servers 120$a$-$c$ and/or proxy servers 130$a$-$c$ (FIG. 1). Henceforth, the description of embodiments of the present invention may use the term 'server' as a representative term for a content server or a proxy server or any other type of server that may be surfed by a client. MLFM 200 operates to accelerate the presentation of pages that are transferred from the server to the clients, reduces the loud over the network, etc. In one exemplary embodiment, MLFM 200 may be a software module that is installed in the server. The server may be configured to perform the translation of ML files via MLFM 200 before transmitting the ML files to the client. In an alternate exemplary embodiment of the present invention, MLFM 200 may be installed in a separate server that is located in an intermediate node over the connection between the content server and the client. In this embodiment, the MLFM 200 receives the transportation between one or more content servers and the clients and performs the file translations on the fly. Such an embodiment allows the file manipulation to be performed without taxing the processing power of the server or the client. A server may comprise one or more MLFM 200 working in parallel.

An exemplary MLFM 200 may comprise a dispatcher module 210, one or more groups of objects (220$a$-$c$, 230$a$-$c$, 240$a$-$c$) that process ML files (MLO), an object deliverer thread pool (ODTP) 250 and a shared memory 260. Each group of MLOs is associated with one type of ML. For instance, in the illustrated embodiment, MLO 220$a$-$c$ process HTML files; MLO 230$a$-$c$ process XML files; and MLO 240$a$-$c$ process WML files. It will be appreciated by those skilled in the art that depending upon its configuration and the particular needs, MLFM 200 may comprise more than the three groups of MLOs 220a-c, 230a-c, 240a-c and each group may comprise more than three objects. Additional one or more groups or types of ML may be added to MLFM 200 in order to manipulate other types of ML files. ODTP 250 may comprise one or more object deliverer threads 252a-c.

Dispatcher module (DM) 210 acts as a manager of the MLFM 200. The DM 210 receives chunks of ML files coming from one or more content servers and then dispatches the chunks to an appropriate MLO 220a-c or 230a-c or 240a-c. After manipulating the ML chunk at the MLO, the manipulated ML chunk may be transferred to the DM 210 in order to be sent to the appropriate client. In an alternate embodiment of the present invention, the DM 210 may perform some parts of the manipulation. For example, in some embodiments the DM 210 may place the fetched objects instead of their links into the ML file before transferring the ML file to the client. In other exemplary embodiments of the present invention the MLO 220a-c, 230a-c, 240a-c may place the fetched objects into an ML chunk or file rather than the links associated with those objects and may transfer a fully manipulated ML chunk to the DM 210 to be further sent to the client. After powering up, the DM 210 may initiate the ODTP 250, it may assign a queue to each one of the object delivery threads (ODT) 252a-c, or alternatively, one queue may be assigned to ODTP 250 that serves all the ODTs 252a-c. Then DM 210 may wait for the first ML chunk. More information about the operation of the DM 210 is disclosed below in conjunction with FIGS. 3 and 4.

Each one of the MLO modules 220a-c, 230a-c, 240a-c can be an object that is created by the DM 210 upon receiving an ML chunk that belongs to a new ML file. Each MLO is dedicated to one ML file. An ML file may comprise one or more data chunks; therefore the MLO is configured to parse parts of an ML file that are received one after the other.

In one exemplary embodiment of the present invention, an MLO may comprise a portion of a common browser. The portion of the common browser can be dedicated to a certain ML type. As a non-limiting example, MLO 220a-c can be dedicated to HTML; MLO 230a-c can be dedicated to XML; and MLO 240a-c can be dedicated to WML, other MLO types may also be used. In such an embodiment, the MLO, which includes a portion of a browser, may traverse the browser links and place the fetched objects rather than simply the links into the ML chunk. Then, the MLO is configured to transfer the manipulated MLO chunk to the DM 210 to be further transmitted to the client. After the last chunk of the ML file is processed and transmitted to the client, the MLO that is associated with this file can be released.

In an alternate exemplary embodiment of the present invention, an MLO may comprise a search module that is configured to search a received chunk of the appropriate ML file. The search module operates to search for one or more browser's links, including but not limited to, links to Java scripts, CSS, etc. Each one of the found browser's links is transferred to the ODTP 250 to be fetched.

In one exemplary embodiment of the present invention, after searching the entire ML chunk, the searched ML chunk is transferred to the DM 210. The ODTs 252a-c may be configured to deliver the fetched objects to the DM 210. The DM 210 may place the fetched objects into the ML chunks instead of the links. The DM 210 may then transfer the manipulated ML chunks that now include the fetched objects to the clients. The DM 210 may transfer the entire manipulated ML chunk, or portions of the ML chunk that include part of the fetched objects, other portions of the manipulated ML chunk may be transferred at a later time after the remainder of the fetched objects are received.

In another exemplary embodiment of the present invention, the MLO 220a-c, 230a-c, 240a-c may be configured to get the fetched objects from ODTP 250 and place the fetched one or more objects into the ML file or chunk rather than simply the links to those objects, to create a manipulated ML chunk. The manipulated ML chunk or a portion of the manipulated chunk may then be transferred to the DM 210 in order to be sent to the client.

The ODTP 250 is a pool of a plurality of objects. Each object is configured to get a link from a queue, to set a connection to an appropriate web server according to the link and to fetch the object that is associated with the link. In one exemplary embodiment, the fetched object may be transferred to the appropriate MLO, the one that requested the relevant link. In an alternate exemplary embodiment, the fetched objects may be transferred to the DM 210 rather than directly to the MLOs.

Shared memory 260 is a memory section that can be used by each one of the modules within the MLFM 200. It can be used as a common interface from which each module can retrieve or deliver information, data, ML chunks, fetched objects, and/or manipulated ML chunks. The shared memory 260 may be utilized to provide the memory for the queue of each one of the modules, etc. The share memory 260 may include a table (an association table) that contains information about the associations between the different ML chunks, ML files, links and objects that are transferred simultaneously in MLFM 200, address, etc. The association table is used in order to route the appropriate information to the appropriate module and to the appropriate location in the ML file.

In one embodiment, the shared memory may be used to house a database of recently retrieved browser objects for recently received browser links. This aspect of the invention further accelerates the rendering of the web pages. For instance, a typical web surfing session will pull up two or more related pages when a web site is visited. On the various web pages for the web site, there may be some common objects that are included on the pages. For instance, company logos, navigation menus, etc. Thus, this aspect of the present invention can store recently fetched objects and thus, not have to fetch the objects yet again when a related page is visited. Instead, the stored object can be immediately entered into the modified markup language file replacing the browser link.

Other exemplary embodiments of the present invention may use other types of common interfaces between the different modules of the MLFM 200, including but not limited to a TDM bus, or any other type of bus that can be used by the hardware that host the MLFM 200. In addition, each module may have its own memory. Other exemplary embodiments may use combinations of various types of common interfaces. More information about the operation of the MLO and ODTP 250 is disclosed below in conjunction with the discussion of FIGS. 3, 4 and 5.

Figure 3:
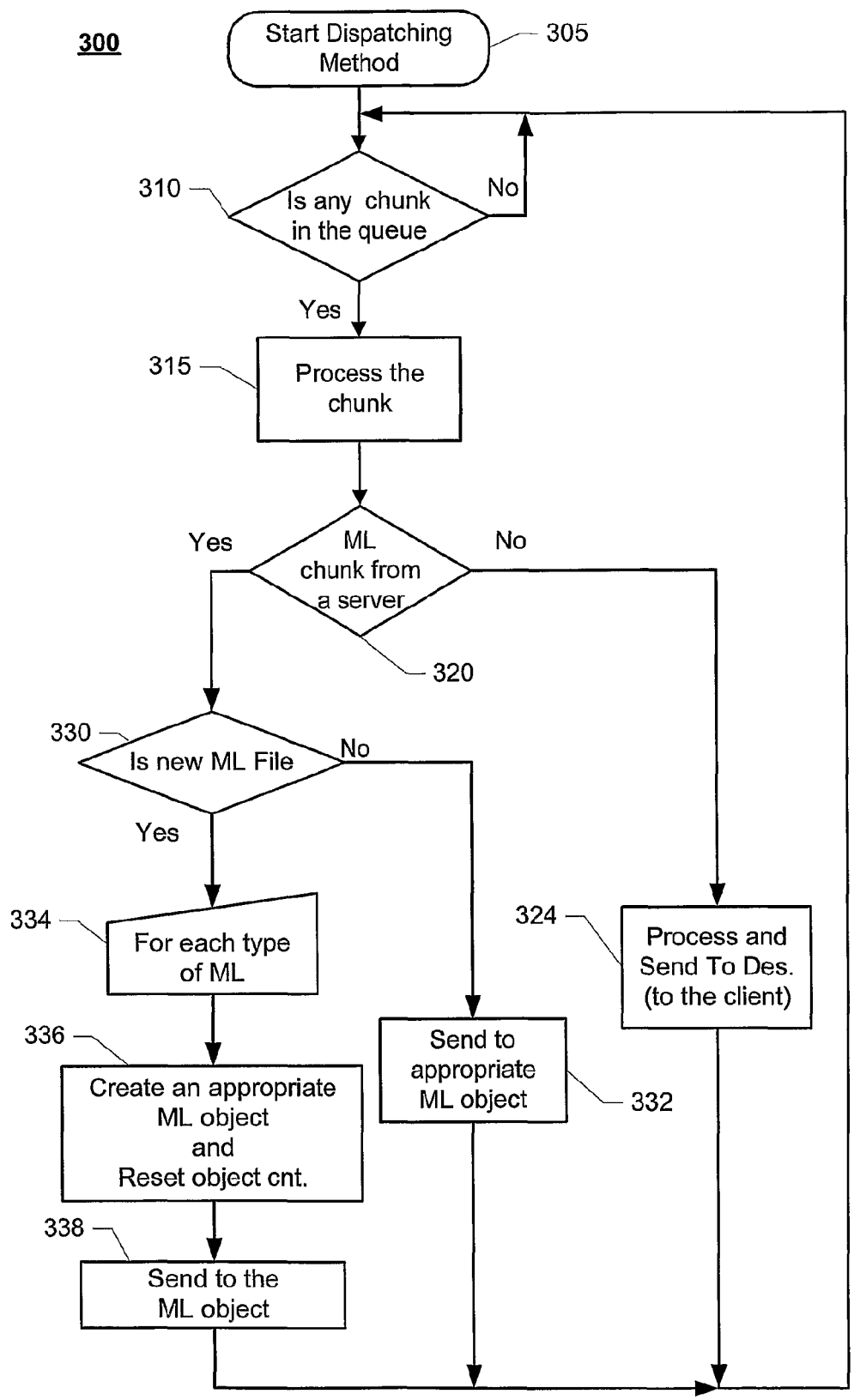
FIG. 3 illustrates a flowchart of relevant steps in an exemplary method that may be used at a dispatcher software module.

FIG. 3 illustrates a flowchart of relevant steps in an exemplary method that may be used at a dispatcher software module. The process 300 that may be used by dispatcher module 210 (FIG. 2) for handling incoming chunks of ML files and transferring manipulated ML chunks to clients. The process 300 commences at an initiation step 305 and may run in infinite loop as long as the MLFM 200 is active. During initiation 305, the DM 210 may create one or more ODTPs 250, configure the shared memory 260, inform each one of the ODTs 252a-c about the location of the relevant queues, and the location of the association table. At step 310, a queue for the DM 210 is checked to determine whether a pointer to a next data chunk exists. If not, the process 300 waits until a pointer to a new chunk arrives into the queue. If a point to a next data chunk exists, process 300 proceeds to step 315 and may retrieve the next packet from the shared memory according to the pointer in the queue.

The data chunk is processed and analyzed at step 315. Information about the data chunk may be added to the appropriate location in the shared memory 260. The information may be updated during the time that the chunk is processed by different modules of MLFM 200. At step 320 a decision is made as to whether the data chunk is a chunk of an ML file that is coming from a content server. The decision can be based on the source IP address of or on information that is stored in the association table. If the data chunk is coming from a content server, a decision is made at step 330 whether or not the ML chunk is the beginning of a new ML file. If the ML chunk is not the beginning of a new ML file, a record about the ML chunk is created in the relevant entry in the association table; a chunk ID number may be added to the data chunk; and based on the information in the association table, and at step 332 the chunk or a pointer to the chunk is placed in a queue of the appropriate MLO that has been associated with the ML file to which the current chunk belongs. The process 300 then returns to step 310 to retrieve the next data chunk, if any exist in its queue.

The record that may be written in the association table may include information that can be used during handling a portion of the data chunk or fetched objects that are relevant to this chunk. The information may include, but is not limited to, fields like source IP address, destination IP address, an ID number that can be given to the current chunk, the address of the queue of the relevant MLO, etc. The relevant MLO is the MLO, which has been assigned to the ML file that includes the ML data chunk.

At step 330, if the data chunk is a beginning of a new ML file, the ML type is analyzed at step 334 and according to the type of the ML file, a new MLO 220*a-c* or 230*a-c* or 240*a-c* (FIG. 2) is created at step 336. A queue for the new MLO is defined in the shared memory 260. An object counter, which is associated with the relevant MLO, is defined and set to a value of zero. The object counter can be used to count the number of browser's links that are found by the relevant MLO. The value of the object counter can be used to point the browser's links and their associated objects and/or the counter can be used as a monitoring device as further described below.

A new entry that will be associated with this new ML file is created in the association table. An ID number may be assigned to this ML file (in this exemplary embodiment the ML file ID number also points the relevant ML object since the relevant MLO is dedicated to the ML file) and an ID may be assigned to the first chunk. Relevant information that may be used to define the new ML file may be added to the new entry. Information about the relevant IP addresses, ML file ID (MLO ID), chunk ID, the address of the queue in the new MLO, as well as other information may be considered as the relevant information. Next at step 338, the first chunk of the new ML file is transferred to the queue of the new MLO that has been created and be assigned to this ML file and the process 300 may return to step 310 to retrieve the next data chunk, if any exist in its queue.

Returning now to step 320, if the source of the ML chunk is not a content server, then the ML chunk came from one of the MLOs (220*a-c*, 230*a-c*, 240*a-c*). Consequently, this data chunk is a manipulated ML data chunk that includes fetched objects instead of browser's links. At step 324, based on the ID fields that are associated with the current data chunk, the appropriate entry in the association table may be retrieved and information about the connection to which the manipulated ML data chunk belongs can be ascertained. Next, the manipulated ML chunk may be sent to the client. The process 300 may then return to step 310 to retrieve the next data chunk, if any exist in the queue.

In the above example of process 300 the MLO is responsible to place the fetched objects into the manipulated ML files or chunks instead of the links pointing to these objects. In an alternate exemplary embodiment of the present invention, in which the DM 210 (FIG. 1) may replace the fetched objects instead of their links to create the manipulated ML data chunk, process 300 may be slightly modified. In such an embodiment, step 324 may be divided into additional steps for handling the case in which the data chunk is a fetched object. More information about such an exemplary embodiment is disclosed below in conjunction with the discussion of FIG. 4.

Figure 4:
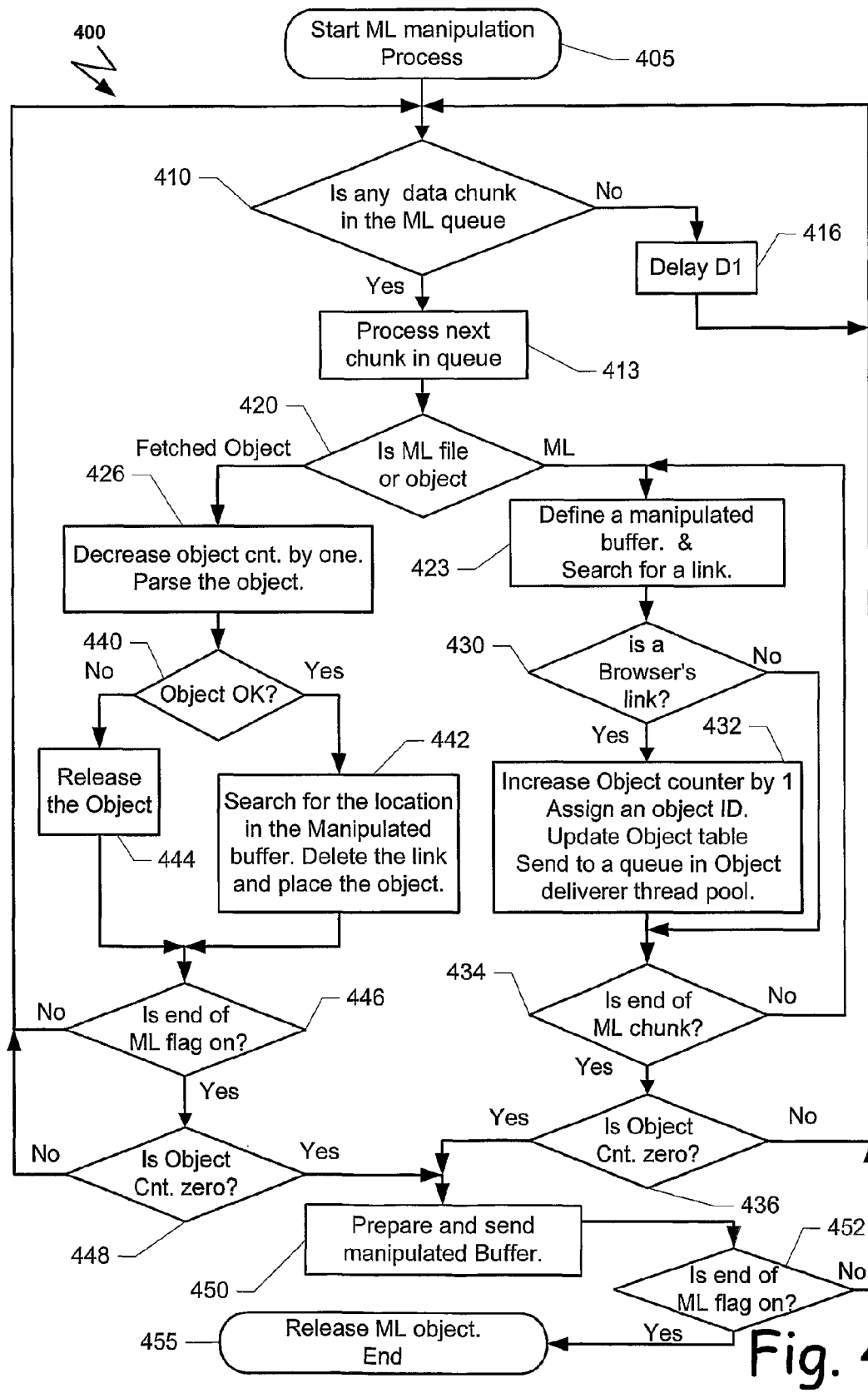
FIG. 4 illustrates a flowchart of an exemplary method that may be used to manipulate a markup language file.

FIG. 4 illustrates a flowchart of an exemplary method that may be used to manipulate a markup language file. The illustrated process 400 commences at step 405 when initiated or invoked by the DM 210 (FIG. 2) once a receiving data chunk is identified to be a first chunk of a new ML file (steps 330 to 338 of FIG. 3). An exemplary MLFM 200 may run one or more manipulating processes 400 simultaneously depending on the number of different ML files that are currently being transferred via the MLFM 200 and the available resource of the MLFM 200. A new ML file that may be received while there are no free resources may be sent to the client as is without being manipulated. In an alternate embodiment, the new ML file may be sent to a queue to wait until the necessary resources are available.

Process 400 may be executed by the MLO 220*a-c*, or 230*a-c* or 240*a-c* that was created by the DM 210 for the relevant new ML file. In the exemplary embodiment of FIG. 4 the MLO also places the fetched objects into the manipulated ML chunk rather than the links associated with the objects and delivers the manipulated ML chunk to the DM 210. In another exemplary embodiment of the present invention, parts of process 400 may be preformed by the DM 210. In such an embodiment DM 210 may operate to replace the links in the file with the fetched objects.

At step 410, the MLO queue is checked to determine if it contains a data chunk. If there is no data chunk in the queue, the MLO waits at step 416 for a period D1 before rechecking the queue. If at step 410 there is a data chunk in the queue, the data chunk is then processed at step 413 by the MLO. Processing the data chunk may include identifying the data chunk, and such identification may be based on information that is retrieved from the association table.

At decision block 420, the data chunk is examined to determine if it is an ML data chunk or a data chunk that belongs to a fetched object (a fetched data chunk). In alternate embodiments in which the DM 210 substitutes the links with the fetched objects, step 420 may be eliminated. If at decision block 420 the data chunk is determined to be an ML data chunk, a manipulated buffer may be defined at step 423, to which the manipulated ML chunk will be written. The ML chunk is then searched or parsed to determine if it contains any browser's links. If 430 during the search step a browser's link is not found, then a decision 434 is made whether the end of the chunk has been reached. If it is not the end of the chunk, process 400 returns to step 423 and continues searching for a link.

If the link found is determined to be a browser's link at decision block 430, then: the object counter is increased by one at step 432; an ID number that may indicate the ML file (as well as the relevant MLO) and the value of the object counter can be associated with the link; the association table may be updated accordingly; information from the ML chunk processed to this point can be written to the manipulated buffer; and the link is transferred to the queue of ODTP 250 while process 400 proceeds to step 434. The information in the manipulated buffer may include the ID number of the object instead of its link. In other embodiments the link itself may be written in the manipulated buffer.

At decision block 434, it is determined whether the end of the chunk has been reached. If the end of the chunk has not been reached, process 400 returns to step 423 and continues the search for a link. If it is the end of the chunk then a decision is made (not shown in the drawings) in decision block 434 whether the end of the chunk is the end of the ML file. If the end of the chunk is the end of the ML file, an 'end of ML file' flag may be set and process 400 may continue to step 436. If the end of the chunk is not the end of the ML file method 400 may continue to step 436 without affecting the end of ML file flag.

At the end of the data chunk, the object counter is examined in decision block 436 to determine if its value is zero. The value of zero indicates that there is no need to wait for a fetched object. If at decision block 436 the counter is not zero, then the process 400 may return to step 410 looking for the next data chunk in the queue. If at decision block 436 the object counter is zero, then the manipulated buffer is prepared at step 450 to be transferred to the DM 210. Preparing the manipulated buffer may include copying the last section of the ML data chunk from the last browser's link to the end of the data chunk. Then the manipulated buffer can be transferred to the DM 210 to be sent to the client and process 400 may proceed to step 452.

In an alternate embodiment of the present invention preparing the manipulated buffer and sending it to the DM 210 may be executed also in step 432.

At step 452, if the end of ML file is true then process 400 is terminated at step 455 and the relevant MLO is released. In addition, the entry in the association table that is used by this MLO may be released. If at step 452 the flag of end of ML file is false, then process 400 returns to step 410 looking for the next data chunk.

Returning to decision block 420, if the data chunk belongs to a fetched object then, the value of the object counter is decreased by one at step 426 and the object data chunk may be parsed and checked for integrity. If at decision block 440 it is determined that the object is not valid, then at step 444 the object is released. If at decision block 440 it is determined that the object is valid, then at step 442 the appropriate location to which the object belongs in the manipulated buffer is found. Finding the location may be based on the object ID and the association table. Then the object is placed in the appropriate location in the manipulated buffer instead of its ID or the browser's link itself. If at decision block 440 the object is found to be not valid, then the object is released and the original browser's link is placed in the right location of the manipulated buffer.

At decision block 446 the end of ML file flag is checked. If the end of ML file flag is false, process 400 returns to step 410 looking for the next data chunk. If the end of the ML file flag is true, then at decision block 448 the value of the object counter is examined. If the object counter is not zero, then process 400 continues at step 410 to wait for the next fetched object. If the object counter is zero, the manipulated buffer is prepared at step 450 to be sent to the DM 210 as it is disclosed above.

In an alternate embodiment of the present invention, at step 442 the manipulated buffer that has been modified to include the object and the portion of the buffer extending to the next browser's link can be prepared and sent to the DM 210. In another embodiment of the present invention in which the DM 210 is responsible to place the fetched objects in the appropriate locations in the manipulated buffer, steps 426 to 455 may be executed by the DM 210.

Figure 5:
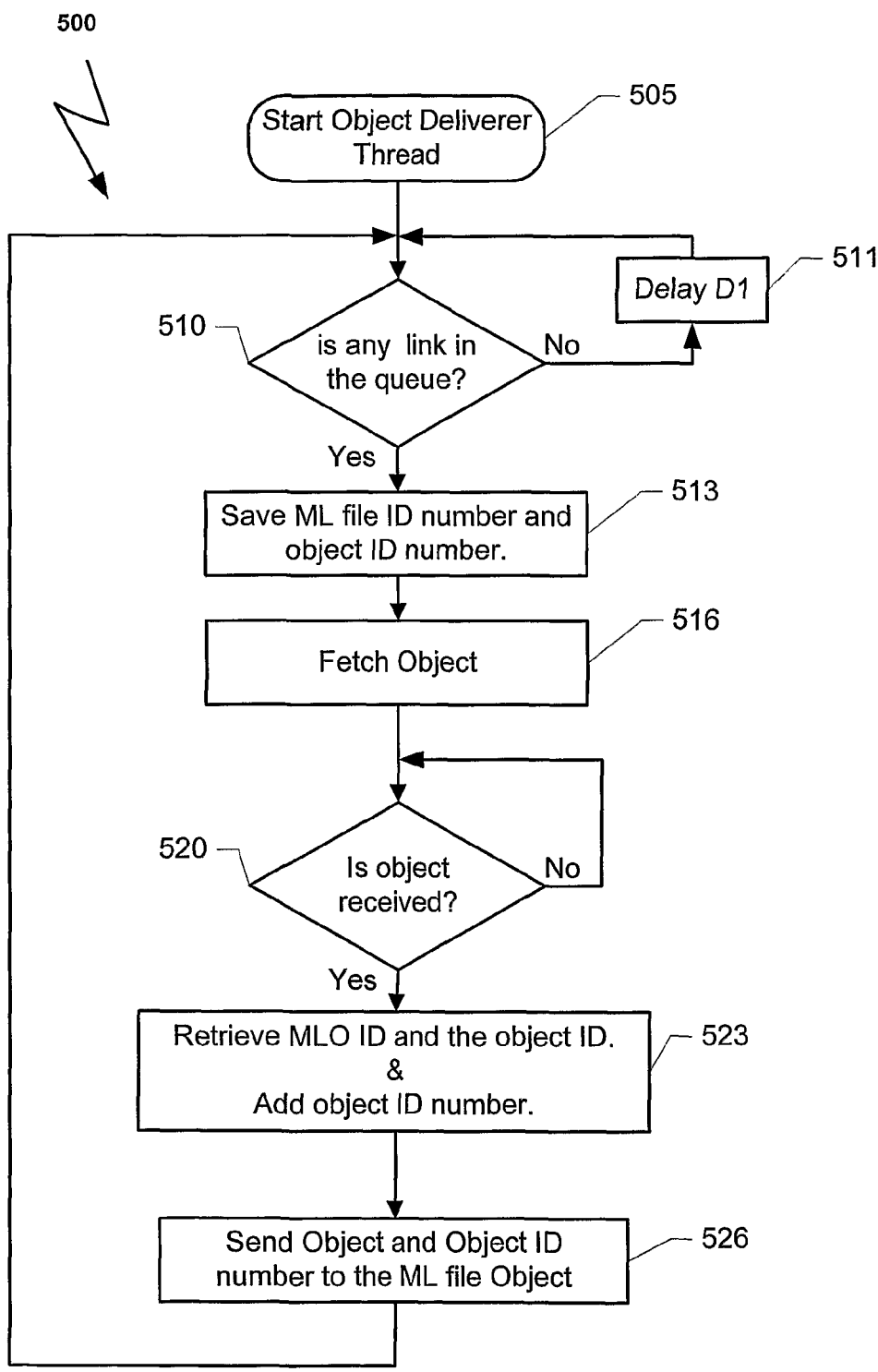
FIG. 5 illustrates a flowchart of an exemplary method that may be used as an object deliverer thread.

FIG. 5 illustrates a flowchart of an exemplary method that may be used as an object deliverer thread. The illustrated exemplary process 500 may be used to fetch a browser link according to an exemplary embodiment of the present invention. Process 500 may be used by any one of the plurality of Object Deliveries Threads 252*a-c* (FIG. 2) of ODTP 250. ODTP 250 may be initiated or invoked by the DM 210 (FIG. 2) during the initiation stage 305 (FIG. 3) of method 300. Once initiated, processing begins at step 305.

An exemplary ODTP 252*a-c* may comprise one or more ODTs 250*a-c* depending on the configuration of MLFM 200. Each one of the ODTs 250*a-c* may handle one browser's object at a time. If there are no objects to be fetched, the ODTs 252*a-c* may run in an idle stage checking the queue of ODTP for the next browser's link at decision block 510. The ODTs 250*a-c* coordinate their access to the queue of ODTP 250.

If at decision block 510 a link to a browser's object is found in the queue by one the ODTs 252*a-c*, then at step 513 the relevant ODT may register its ODT ID number in the appropriate field in the entry that belongs to the relevant browser's link in the association table. In an alternate embodiment, the ODT may save the relevant ML file ID (MLO ID) and the object ID in its memory. This address in its memory can be used later to define to which queue to deliver the fetched object. After the registration, a connection is set at step 516 according to the browser's link in order to fetch the object.

In decision block 520, if the object is received, the MLO ID and the object ID are retrieved at step 523. The object ID is added to indicate the fetched object and the fetched object is transferred at step 526 to the queue of the relevant MLO. Then the ODT 252*a-c* returns to step 510. If in decision block 520 an object is not received, after a certain period of time, an error indication may be returned to the appropriate MLO in steps 523 and 526.

Overall, this invention will improve the experience of a surfer during browsing the network. Aspects and embodiments of the invention operated to reduce the time to text of the retrieved page and reduce the amount of connections that a client browser may set during surfing a content server.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A server communicatively coupled to an Internet Protocol "IP" network and configured to transfer markup language based content that represents a web page to a client computer within the network, the server comprising:
a dispatcher module that:
interfaces to a content source and receives a markup language content from the content source, wherein the received markup language content is targeted toward a browser application at a requesting client computer and includes one or more browser links;
provides at least a portion of the received markup language content to a markup language object module;
receives modified markup language content from the markup language object module; and
sends the modified markup language content toward the browser application at the requesting client computer; and
the markup language object module that:
receives the provided markup language content from the dispatcher module;
parses the provided markup language content;
identifies a browser link within the provided markup language content;
traverses the browser link to obtain the corresponding object;
replaces the browser link in the provided markup language content with the corresponding object to modify the provided markup language content; and
provides the modified markup language content to the dispatcher module;
wherein the server operates in an intermediate node communicatively positioned between the content source and the requesting client;
wherein the modified markup language content that is sent toward the browser application has a reduced number of browser links than the markup language content received from the content server; and
wherein the modification is transparent to the browser application at the client computer.

2. The server of claim 1, wherein the corresponding object is selected from a group consisting of Java scripts and style sheets.

3. The server of claim 1, wherein the markup language of the markup language content is selected from the group of markup languages consisting of Hyper Text Markup Language "HTML", Extensible Markup Language "XML", Wireless Markup Language "WML", Standardized General Markup Language "SGML", and Handheld Device Markup Language "HDML".

4. The server of claim 1, wherein the dispatcher module to traverses particular browser links and replace the particular browser links with fetched objects.

5. The server of claim 1, further comprising an object deliverer thread that:
receives a browser link from the markup language object module;
fetches the object associated with the browser link; and
provide the fetched object to the markup language object module; and
the markup language object module further to traverses the browser link by providing the browser link to the object deliverer thread and receiving the fetched object from the object deliverer thread.

6. A server communicatively coupled to an IP network that transfers markup language based content that represents a web page to a client computer within the network, the server comprising:
a dispatcher that:
interfaces to a plurality of content sources and receive markup language files from one or more of the content sources, in response to requests from one or more browser applications, wherein each browser application is installed in a client device;
identifies the format of each particular markup language file received and initiates a unique markup language object module to process each particular markup language file;
provides at least a portion of a received particular markup language file to an initiated markup language object module;
receives modified markup language files from the markup language object modules; and
provides the modified markup language file toward a requesting client device; and
one or more markup language object modules, wherein each:
receives at least a portion of a particular markup language file from the dispatcher;
parses the received portion of a particular markup language file;
identifies a browser link within the at least a portion of the received markup language file;
traverses the browser link to obtain the corresponding object;
replaces the browser link with the corresponding object to modify the at least a portion of the markup language file; and
provides the modified portion of the markup language file to the dispatcher module;
wherein the server is installed in an intermediate node between the content source and the requesting client;
wherein the modified markup language content that is sent toward the browser application has a reduced number of browser links then the received markup language content;
wherein the modification is transparent to the browser application at the client computer and
wherein the rendering of the modified markup language content by the browser is accomplished in less time than what would be required to render the received markup language files due at least in part to a reduced number of browser links that must be traversed.

7. The server of claim 6, wherein the markup language file format is selected from the group of markup language file formats consisting of HTML, XML, WML, SGML, and HDML.

8. The server of claim 6, wherein the dispatcher processes multiple file types simultaneously and initiates a markup language object module for each of the simultaneously processed multiple file types.

9. The server of claim 6, further comprising an object deliverer thread pool, wherein each object deliverer thread in the object deliverer thread pool:
receives a browser link from a markup language object module;
fetches the object associated with the browser link; and
provides the fetched object to the markup language object module.

10. The server of claim 9, wherein the dispatcher further traverses particular browser links and replaces the particular browser links with the fetched objects.

11. The server of claim 10, wherein each of the plurality of client devices receives a traversed web page with at least one browser link having been replaced by the actual object associated with the browser link.

12. The server of claim 9, further comprising a memory element that stores recently traversed browser links and associated browser objects, wherein if a browser object is stored in the memory element the object deliverer thread further fetches the browser object in lieu of traversing the associated browser link.

13. A communication system that accelerates the presentation of a web page, wherein the web page is described by a markup language file, the system comprising:
a plurality of servers, each server comprising a plurality of web pages, wherein the plurality of servers are configured to respond to requests to deliver web page content by transmitting a markup language file associated with the requested page;
a plurality of clients, each client having a browser software program for rendering received markup language files;
one or more proxy servers residing between the plurality of servers and the plurality of clients;
a network for connecting the plurality of clients with the plurality of servers and one or more proxy servers; and
comprised within the one or more proxy servers, a markup language file manipulator module that receives the markup language files from one or more of the plurality of servers, identifies one or more browser's links, traverses the one or more browser's links to obtain per each browser link its corresponding object, modifies the received markup language files and transmits the modified markup language files to one or more of the requesting clients, wherein:
the modified markup language file is from the same format as the received markup language file;
the modified markup language file has one or more of the browser links in the original markup language file replaced with its corresponding object; and
the proxy server sends at least a portion of the modified markup language file toward the browser application of a requesting client before having fully received the markup language file from a server;
wherein the modified markup language content that is sent toward the browser application has a reduced number of browser links then the received markup language content;
wherein the modification of the markup language content before sending the modified markup language content toward the requesting browser reduces the time for presenting the received web page by the browser.

14. A method that accelerates the rendering of a web page within a browser like application running on a client device, the method comprising:
receiving chunks of a plurality of markup language files coming from one or more sources and each markup language file being directed to a requesting client device;
identifying at least one browser link in the received chunks of the plurality of markup language files;
fetching an object that is associated with the identified browser link;
replacing the browser link with the fetched object to create a chunk of modified markup language file; and
transferring the chunk of modified markup language file to the requesting client device before receiving in full the markup language file to which the chunks belong
wherein the modified markup language content that is transferred to the requesting client device has a reduced number of browser links then the received markup language content;
wherein the modification of the markup language content before transferring the modified markup language content toward the requesting client device reduces the time to text of the received web page; and
wherein the modification is transparent to the client device.

15. The method of claim 14, further comprising the steps of:
for each of the plurality of markup language files received, identifying the format of the markup language file; and
initiating a format dependent process for performing the identifying, fetching and replacing steps.

16. The method of claim 14, further comprising the steps of:
maintaining in local memory a database of recently fetched browser objects for received browser links;
upon receiving a markup language file including a recently received browser link, extracting the browser object from local memory; and
replacing the browser link with the browser object.

* * * * *